Nov. 18, 1947.    J. L. GOLDING    2,431,114
DEVICE AND METHOD FOR APPLYING THERMOPLASTIC CAPS TO CONTAINERS
Filed Dec. 9, 1942
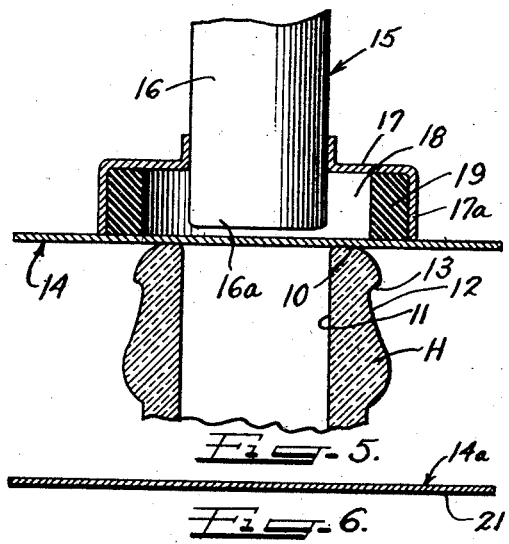
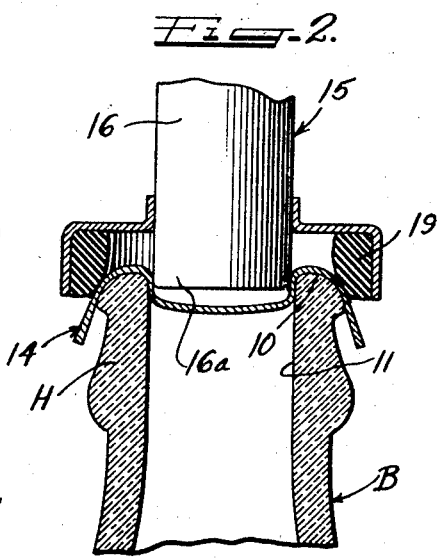
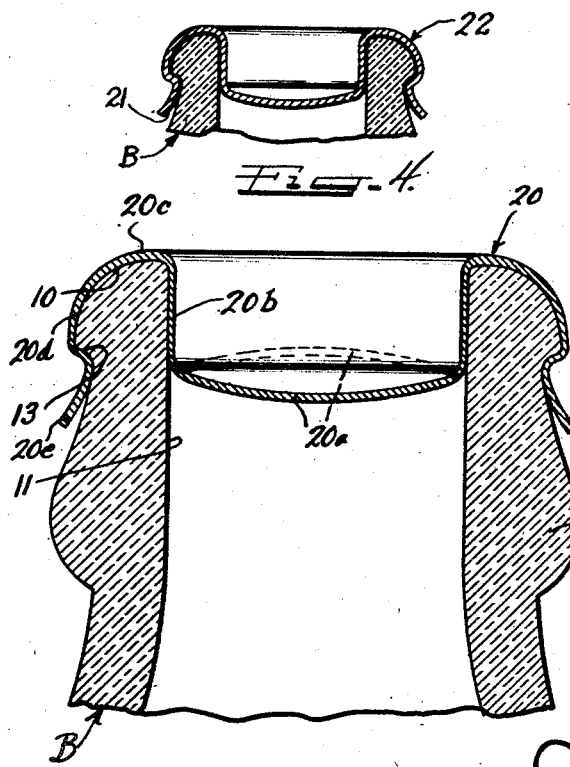
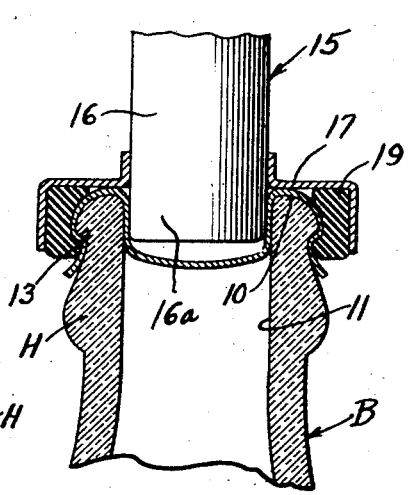
Inventor
JAMES LEONARD GOLDING.
by Charles W. Rels
Attys.

Patented Nov. 18, 1947

2,431,114

UNITED STATES PATENT OFFICE 2,431,114

DEVICE AND METHOD FOR APPLYING THERMOPLASTIC CAPS TO CONTAINERS

James Leonard Golding, Chicago, Ill.

Application December 9, 1942, Serial No. 468,365

8 Claims. (Cl. 226—83)

This invention relates to the sealing of containers with thermoplastic sheet material shaped in situ on the container to form the sole closing means or primary seal.

Specifically the invention relates to the in situ formation of closures on the container by treating sheet material under heat and pressure conditions causing it to be stretched and ironed over inner and outer container walls into intimate conformity with such walls.

According to this invention thermoplastic sheet material heated to its softening temperature is placed over the opening of a container to be sealed and is deformed under pressure so as to depress a central portion thereof into the container mouth while simultaneously depressing an outer marginal portion thereof around the rim of the container and under a bead on the container in the event that the container is provided with such a bead. During such deforming operation the thermoplastic material is actually stretched or ironed against the inner wall of the container defining the opening as well as against the outer wall or rim of the container surrounding the opening. This ironing action somewhat decreases the thickness of the sheet material at these points and causes the sheet material to firmly adhere to the inner and outer container walls since it is caused to identically conform to the shape of these walls. Upon cooling of the resulting cap or seal member below the softening point of the thermoplastic material, a firmly affixed seal or cap is provided capable of withholding pressures.

While the invention will hereinafter be specifically described as embodied in a bottle closure method, it should be understood that the invention is not limited to such use since it clearly includes, within its scope, seals for all types of containers.

It will also be understood that the word "sheet" is used herein in its broadest sense to include material which may be cast in sheet form, extruded in strip form, sliced from rods, bars, blocks and the like and is not limited to material initially produced in sheet form and known in the trade as plastic sheets.

It is, then, an object of this invention to form a thermoplastic primary closure in situ on the container.

A further object of the invention is to provide a method of forming a bottle cap in situ on a bottle to constitute a pressure-resisting seal for the bottle.

A still further object of this invention is to provide a method of sealing containers with thermoplastic sheet material wherein the container itself forms the shaping member for the seal.

A still further object of this invention is to provide a simple, inexpensive method of sealing bottles for carbonated beverages and the like without using metal, rubber or cork.

Other and further objects of the invention will be apparent to those skilled in the art from the following detailed description of the annexed sheet of drawings which, by way of preferred example, illustrates one embodiment of the invention.

On the drawings:

Figure 1 is a vertical cross-sectional view, with parts in elevation, of the head of a bottle, a disk of thermoplastic sheet material, and a cap-forming machine illustrating the relative positions of the parts at the start of a sealing operation according to this invention.

Figure 2 is a view similar to Figure 1 but illustrating the position of the parts in an intermediate stage of the sealing operation.

Figure 3 is a view similar to Figures 1 and 2 but illustrating the parts at the completion of the sealing operation.

Figure 4 is an enlarged fragmentary vertical cross-sectional view of a bottle head sealed with a cap in accordance with this invention.

Figure 5 is a cross-sectional view of a thermoplastic disk lined or covered with a flexible sheet or coating.

Figure 6 is a cross-sectional view of a cap formed from a lined disk.

As shown on the drawings:

In Figures 1 to 4 inclusive B designates a conventional glass beverage bottle for beer, carbonated soft drinks, fruit and vegetable juices and the like. The bottle B has the conventional head H with a rounded circular rim end 10, an inner wall surface 11 defining the opening to the bottle, an external wall surface 12, and a bead 13.

A circular disk 14 of thermoplastic material heated above its softening point is placed over the rim 10 of the bottle to extend across the bottle opening. The disk is of sufficient diameter to extend considerably beyond the outer wall surface 12 of the bottle head. It will be understood that, while a circular disk 14 is preferred for a circular mounted bottle, the shape of the piece 14 can be varied if desired.

The disk 14 is composed of thermoplastic sheet material and is preferably about $\frac{1}{16}$ inch thick. Numerous types of rials are operative, such, as, for example, methyl methacrylate resins, methylacrylate resins, polystyrene resins, cellulose acetate resins, cellulose nitrate resins, and the like materials. Any tough plastic sheet material which can be deformed under heat and pressure into bottle-cap shape and retain said shape when cooled is operative.

The disk 14 is heated to temperatures above its softening point and a capping tool 15 is placed on top of the disk. This capping tool 15 is composed of a stud or post 16 with a leading end 16a sized and shaped so as to fit into the mouth of the bottle. As indicated, the bottle mouth is defined by circular inner wall surface 11 of a diameter slightly greater than the diameter of the leading end 16a of the post, but this leading end of the post has a diameter sufficiently great so that it will iron out the thermoplastic sheet material against the inner wall surface 11 during the capping operation as will be more fully hereinafter described.

A rigid skirt member 17 is affixed to the post 16 to define an open bottomed chamber 18. The skirt 17 is lined with a rubber ring 19 which is affixed to the depending flange 17a thereof. Other resilient deformable material than rubber may be used. The rubber ring 19 has an internal diameter less than the diameter of the bead 13 of the bottle, for a purpose to be more fully hereinafter described. The skirt and rubber ring preferably project from about 3/16 to ¼ inch below the leading end 16a of the post so that the rubber ring will engage the disk 14 before the post engages the disk.

According to this invention, and as shown in Figure 2, the tool 15 is pressed against the disk 14 on the bottle B to move the rubber ring 19 into tight engagement with the outer portion of the disk for holding the disk over the rim of the bottle, and then move the leading end 16a of the post 16 into the mouth of the bottle. The rubber ring 19 will be resiliently deformed as indicated to iron the outer marginal portion of the disk 14 over the rim of the bottle and hold the disk in taut stressed condition across the mouth of the bottle. The central portion of the stressed disk 14 will next be depressed into the mouth of the bottle by the leading end 16a of the post, and is ironed and stretched tightly against the inner wall surface 11 of the bottle.

As shown in Figure 3, the tool 15 is forced over the bottle B until the top wall of the skirt 17 thrusts against the rim 10 of the bottle. When the tool reaches this position the leading end 16a of the post has depressed the central portion of the disk 14 into the mouth of the bottle to a level beneath the bead 13 while the rubber ring 19 of the tool has depressed the outer marginal portion of the disk over the rim 10 and under the bead 13. The resiliency of the ring 19 will cause the thermoplastic material to be forced into full locking engagement under the bead 13. As a result of this operation the bottle cap 20, best shown in Figure 4, is formed in situ on the bottle B. The thermoplastic material of the cap cools during the forming operation to a temperature below its softening point and the tool 15 can readily be removed from the cap.

The cap 20 has a depressed central portion 20a in the mouth of the bottle bounded by an upstanding flange 20b which has been stretched and ironed tightly against the inner wall 11 of the bottle. An outturned flange portion 20c covers the rim 10 of the bottle and a downturned flange portion 20d extends from the rim-covering portion 20c under the bead 13 of the bottle into locking engagement therewith. A skirt portion 20e depends beneath the flange portion 20d and is adapted to be engaged with a bottle-opening device.

The flange portions 20b and 20d are somewhat thinner than the original sheet material 14 since they have been stretched away from the rim-covering portion 20c during the cap-forming operation. These portions 20b and 20d are tightly ironed against the inner and outer walls of the bottle into exact conformity with these walls and have a firm gripping engagement therewith. The flange portion 20c, by virtue of having areas of the original disk stretched away from it, likewise has the exact conformity of the rim 10 in full gripping engagement with this rim portion.

In the formation of the cap, as best illustrated in Figures 2 and 3, the rubber ring will be deformed in accordance with the external shape of the bottle head so as to iron the thermoplastic material over the bead 13 and, since the rubber is stressed during this deformation, it will push the thermoplastic material into locking engagement under the bead as soon as the tool has been forced to a level beneath the bead.

The depressed central portion 20a may, due to internal pressures of carbonated beverages and the like in the bottle, be bulged outwardly to the position shown in dotted lines in Figure 4 but, in assuming this bulged position, the flange 20b of the cap is actually forced into tighter wedging engagement with the inner wall 11 of the bottle so that leakage will not occur.

An ordinary bottle cap opener can be used to remove the in situ formed thermoplastic caps of this invention by thrusting on the skirt 20e of the cap. The cap, being of plastic materials which might be quite brittle at temperatures below their softening points, may crack or split during the opening operation, but this is unobjectionable since the caps are intended for disposal after a single usage.

As shown in Figure 5, the disk 14a can, if desired, be covered with a liner 21 of flexible material such as paper, Cellophane, any suitable coating material, and the like to prevent pieces of the plastic from dropping into the bottle if the cap is broken during removal. The liner should be flexible at the removal temperatures, so that it will not crack or break. The lined cap 22 made from the disk 14a thus, as shown in Figure 6, will have the liner 21 between the plastic material and the bottle.

If a threaded container neck, such as is provided on screw top containers is used in place of a beaded bottle neck, the caps of this invention will be depressed and locked into the threads on the bottle neck.

From the above descriptions it will be understood that this invention now provides a method of forming a primary container seal, composed of a single sheet of thermo-plastic material, in situ on the container to intimately overlie the inner and outer wall surfaces of the container mouth in tight gripping relation therewith. The thermoplastic material is actually in stressed and stretched condition on the container because of the manner in which it is drawn by the cap-forming tool.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of closing a container which comprises heating a sheet of thermoplastic material to a temperature at which it is deformable, placing the heated sheet across a container opening, pressing the central portion of the sheet into the opening against an inner wall of the container defining the opening, simultaneously pressing a marginal portion of the sheet over the outer wall of the container while stretching the sheet in opposite directions to decrease the thickness of the portions lying against the inner and outer walls of the container for ironing the same into tight clamping engagement therewith, and allowing the thus formed cap to cool below the softening temperature of the thermoplastic material for retaining the cap shape.

2. The method of sealing a bottle having a rim bead which comprises placing a disk of deformable plastic sheet material over the mouth of the bottle, simultaneously deforming the sheet material into cap shape and drawing portions thereof to thin down and stress said portions to intimately overlie the inner and outer walls of the bottle mouth and under the rim bead of the bottle, and setting the thus deformed sheet on the bottle for retaining its shape.

3. A device for sealing containers comprising a post having a leading end adapted to enter a container mouth, a skirt portion secured on said post having a downturned flange, and a ring of resilient material seated in said skirt portion in engaging contact therewith around its circumference and surrounding the leading end of the post in spaced relation therefrom.

4. A capping tool comprising a shank, a skirt secured to said shank having a downturned flange surrounding a free end of the shank and terminating below said free end, and a ring of resilient material bottomed in said skirt and backed by and secured to said flange to be held thereby against radial expansion, said ring surrounding the leading end of the shank in spaced relation therefrom.

5. The herein described method of forming a blank to apply a cap upon a bottle or the like provided with a bead having a maximum exterior diameter, comprising heating a blank formed of thermoplastic material so that it may be formed and drawn, applying the heated blank to the free end of the bead, forming the blank about the outer side of the bead to provide a skirt portion surrounding the bead and subjecting the skirt portion adjacent to the maximum outer diameter of the bead to an axial drawing action and thereby reducing the thickness of the skirt portion adjacent to said maximum diameter, and causing the formed cap to harden.

6. The method of applying a thermoplastic crown cap to a bottle neck comprising placing upon the top of the bottle neck a hot flat disk of thermoplastic material, applying pressure upon the disk while heated to force the same into engagement with the top of the neck and bending down the marginal portion of the disk to form a skirt, axially drawing the skirt to reduce the thickness thereof while the thermoplastic material is heated, exerting a radial inward pressure upon the outer face of the skirt while the thermoplastic material is heated, allowing the resultant cap to cool, and then relieving the radial pressure action.

7. The herein-described method of forming a blank to apply a cap upon a bottle or the like provided with a bead having a maximum exterior diameter comprising heating a blank having a greater diameter than the bead and formed of thermoplastic material so that it may be formed and drawn, applying the heated blank to the free end of the bead, forming the blank about the outer side of the bead to provide a skirt surrounding the bead and subjecting the skirt portion adjacent the said maximum exterior diameter to an axial drawing action thereby reducing the thickness of the skirt adjacent to said maximum exterior diameter, subjecting the skirt to radial inward pressure to produce a portion thereof radially inward of said maximum exterior diameter, and causing the formed cap to harden.

8. The method of closing a container opening comprising placing a heated sheet of thermoplastic material across the container opening, pressing the central portion of the sheet into the opening against an inner wall of the container defining the opening, simultaneously pressing a marginal portion of the sheet over an outer wall of the container while stretching the sheet in opposite directions to decrease the thickness of the portion lying against the outer wall of the container for drawing and ironing the same into tight clamping engagement therewith, and allowing the thus formed sheet to cool for retaining the deformed shape.

JAMES LEONARD GOLDING.

REFERENCES CITED

The following references are of record in the file of this patent:

UNITED STATES PATENTS

| Number | Name | Date |
| --- | --- | --- |
| 1,114,323 | Westlake | Oct. 20, 1914 |
| 1,269,773 | Baker | June 18, 1918 |
| 1,780,639 | Burdick et al. | Nov. 4, 1930 |
| 1,792,593 | Lippold | Feb. 17, 1931 |
| 1,905,356 | West | Apr. 25, 1933 |
| 2,099,056 | Ferngren | Nov. 16, 1937 |
| 2,171,015 | Webb | Aug. 29, 1939 |
| 2,202,181 | West | May 28, 1940 |
| 2,210,509 | Strauch | Aug. 6, 1940 |
| 2,325,309 | De Swart | July 27, 1943 |

FOREIGN PATENTS

| Number | Country | Date |
| --- | --- | --- |
| 49,546 | Denmark | Nov. 8, 1934 |